US006019247A

United States Patent [19]
Scott

[11] Patent Number: 6,019,247

[45] **Date of Patent: *Feb. 1, 2000**

[54] ROTARY ROLLED COIN DISPENSER

[75] Inventor: Lowell Scott, Burlington, Ky.

[73] Assignee: Hamilton Safe Company, Inc., Fairfield, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/967,982

[22] Filed: Nov. 12, 1997

[51] Int. Cl.[7] .......... G06F 11/52

[52] U.S. Cl. .......... 221/88; 221/120; 221/133; 221/232

[58] Field of Search .......... 221/78, 79, 74, 221/277, 9, 13, 232, 120, 121, 87, 88, 123, 124, 133

[56] References Cited

U.S. PATENT DOCUMENTS

| | | | |
|---|---|---|---|
| 954,873 | 4/1910 | Moulton | 221/79 X |
| 3,162,287 | 12/1964 | Lupovici | 221/121 |
| 4,159,783 | 7/1979 | Crasnianski | 221/121 X |
| 4,282,892 | 8/1981 | Burnside | 221/266 X |
| 4,519,522 | 5/1985 | McElwee | 221/79 X |
| 4,519,523 | 5/1985 | Ohba et al. | 221/129 |
| 4,717,044 | 1/1988 | Suzuki et al. . | |
| 4,785,969 | 11/1988 | McLaughlin | 221/79 X |
| 4,839,505 | 6/1989 | Bradt et al. | 221/88 X |
| 4,940,162 | 7/1990 | Thie . | |
| 4,966,304 | 10/1990 | Kelly | 221/197 X |
| 5,110,009 | 5/1992 | Gartner et al. | 221/266 |
| 5,176,285 | 1/1993 | Shaw | 221/79 X |
| 5,394,174 | 2/1995 | Nguyen | 346/139 R |
| 5,722,564 | 3/1998 | Tiraboschi | 221/131 |

*Primary Examiner*—William E. Terrell
*Assistant Examiner*—Patrick Mackey
*Attorney, Agent, or Firm*—Smith, Gambrell & Russell, LLP

[57] ABSTRACT

A rolled coin dispensing apparatus is disclosed. The apparatus includes a rotatable dispensing wheel that holds coin rolls, a rotary drive mechanism for rotating the dispensing wheel to a dispense position, and an ejecting mechanism for ejecting a predetermined number of coin rolls from the dispensing wheel. The dispensing wheel has outer and inner wheel structures that support divider members which receive rolled coin cassettes therebetween. The ejecting mechanism includes pusher arms arranged exteriorly of each dispensing wheel and ejector bars, fixed to each arm, that are located interiorly of the outer wheel structure to be pushed into a cassette disposed at the dispense position to obtain coin rolls therefrom. The ejector bars and cassette located at the dispense position are arranged nonradially with respect to the axial center of their cassette wheel. The present invention also is an automatic banking system including such a rolled coin dispensing apparatus, and further a rolled coin cassette for use with such a dispensing apparatus or automatic banking system.

20 Claims, 14 Drawing Sheets

ROTARY ROLLED COIN DISPENSER

FIELD OF THE INVENTION

The present invention pertains to an apparatus for high volume dispensing of coins with improved reliability. In particular, the present invention pertains to a dispensing apparatus which receives cassettes pre-loaded with coins. The dispensing apparatus includes rotary cassette-holding wheels that bring a cassette with coins of a desired denomination into position, and a driven pushing mechanism for dispensing a desired number of coins from the cassette.

BACKGROUND OF THE INVENTION

Conventional coin dispensing machines have relied upon gravity as the mechanism for coin feeding. Many conventional machines operate with loose coins. Such conventional arrangements have been subject to jamming, in particular such machines are subject to what is known as the "log jam effect" to those in this art. This slows operation and requires frequent servicing in order to correct jam conditions. It also necessitates close monitoring of the machine. Further, loose coin machines must be loaded at the site of the machine. This requires rather long periods during which service personnel must be present at the coin machine site.

SUMMARY OF THE INVENTION

The present invention relates to a rotary rolled coin dispenser, as well as a method of dispensing rolled coins with the inventive apparatus. The rolled coin dispenser according to the present invention operates at a high dispensing speed with great reliability. A commercial embodiment dispenses coin rolls at a rate of one roll per second, per wheel.

The dispensing apparatus includes at least one rotatable dispenser wheel that holds cassettes loaded with coin rolls. The cassettes are insertable into slots provided around the dispensing wheel. The cassettes are pre-loaded with rolled coins before they are inserted into the dispensing wheel. As such, the cassettes may be loaded with coin rolls at a site different from where the rolled coin dispenser is located. This vastly reduces the time necessary for loading of the inventive apparatus with coin rolls by service personnel. Such time reduction also increases the efficiency of the service personnel as well as their security.

Coin rolls dispensed from the cassettes by the dispensing apparatus preferably are provided from the top of the dispenser. A pushing mechanism ejects a desired number of coin rolls from the selected cassette under power of a precisely controlled motor. By this arrangement, the rolled coin dispenser according to the present invention avoids reliance upon gravity for dispensing coin rolls and this avoids jams which hamper conventional machines.

Preferably, both the rotary dispensing wheel and the pusher or ejector mechanism are driven by a pulse width motor (PWM). An encoder is provided with each rotor for motor control. A dedicated processor or computer provides overall control of the coin dispenser. The computer counts encoder pulses in order to control each motor for precise positioning of the dispensing cassette wheel and the ejector mechanism corresponding to each wheel. Further, provision of PWM motors with their respective encoders provides for "zero" setting of the rotary axis for each cassette wheel and the linear position for each pusher mechanism. This zeroing capability, in turn, provides the rolled coin dispenser apparatus in accordance with the present invention to perform self-inventory procedures. The self-inventory can be performed on-site or under computer control at an off-site location.

In a preferred implementation, a touch screen is provided for user interface with the rolled coin dispenser. The touch screen permits the user to enter instructions and request status indications and reports from the apparatus. The touch screen provides the user with the status of the system, for example, whether the system is available for customer usage or is out of service for restocking. The screen also provides an inventory report of coins, and if also desired, cash within the system. It provides instructions for restocking, reports for, example, reconciliation of transactions, and where necessary, test screens.

As will become apparent to those of ordinary skill in the art, the coin roll dispensing apparatus in accordance with the present invention is equipped with cassette wheels wherein each of the wheels is capable of holding and dispensing any denomination of coins. As such, the rolled coin dispensing apparatus of the present invention is suitable for dispensing U.S. coinage as well as that of other countries. Furthermore, it is contemplated that the dispensing apparatus of the present invention is suitable for dispensing or vending of objects other than rolled coins. Such apparatus is suitable for vending any goods for which dispensing under power, rather than by gravity, is desired.

In summary, a dispensing apparatus in accordance with the present insertion comprises a rotatable dispensing wheel adapted to hold objects to be dispensed; rotary drive means for rotating the dispensing wheel to a dispense position; and ejecting means for ejecting a predetermined number of objects from the dispensing wheel when the wheel attains the dispense position. In a preferred form, the dispensing wheel is adapted to hold coin cassettes containing coin rolls therein, the dispensing wheel including means for receiving coin cassettes; and the ejecting means ejects a predetermined number of coin rolls from a selected cassette.

Also, a method of dispensing coin rolls by means of such a dispensing apparatus including a rotary dispensing wheel that holds the coin rolls, and an ejecting means for ejecting a predetermined number of coin rolls from the dispensing wheel comprises the steps of: rotating the dispensing wheel until a coin roll held by the wheel is positioned at a dispensing position; halting rotation of the dispensing wheel; and causing the ejecting means to push coin rolls out of the dispensing wheel.

On the other hand, a system for dispensing cash and rolled coins in accordance with the present invention comprises: a cash dispensing apparatus; a coin roll dispensing apparatus; information input means for receiving user authorization information and user requests information; information output means; and control means for controlling the cash dispensing apparatus and the coin roll dispensing apparatus in response to user information received at the input means and for communicating responses to received user information by the dispensing system over the output means. The coin roll dispensing apparatus includes a rotatable dispensing wheel adapted to hold coin rolls; rotary drive means for rotating the dispensing wheel to a dispense position; and ejecting means for ejecting a predetermined number of coin rolls from the dispensing wheel when the wheel attains the dispense position.

Also, in accordance with the present invention, a coin roll cassette for use in a coin roll dispensing apparatus including at least one rotatable dispensing wheel which has means for engaging cassettes therein to retain the cassettes within the wheel, rotary drive means for rotating the dispensing wheel to a dispensing position, and pusher arm means defining a longitudinal axis along which the pusher arm means moves reciprocally to enter the cassette to eject a predetermined number of coin rolls from the cassette when the dispensing wheel is rotated by the drive means to place the cassette in the dispense position comprises a tubular body open at a top portion and a bottom portion thereof; retainer means on the body for engaging with the engaging means of the dispensing wheel; and means for arranging coin rolls within the cassette to be substantially perpendicular to the longitudinal axis of the pusher arm means, whereby the pusher arm means enters the open bottom portion of the cassette to eject coin rolls from the open top portion thereof.

DETAILED DESCRIPTION OF THE PREFERRED EMBODIMENTS

Overall Configuration

Figure 1:
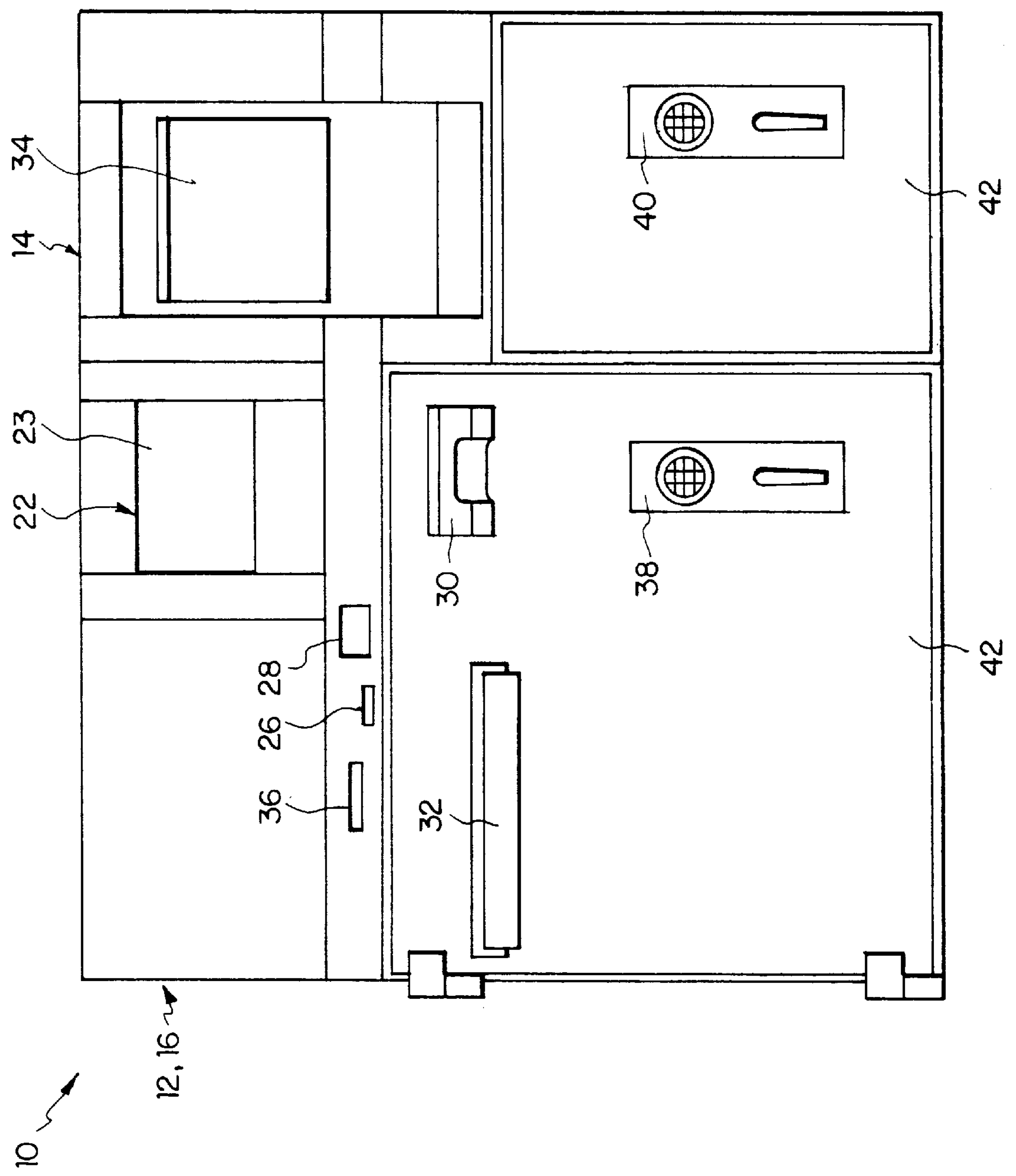
FIG. 1 is a front view of a composite system for automatic banking incorporating a rolled coin dispenser in accordance with the present invention.

FIG. 1 shows a preferred embodiment of a composite system 10 according to the present invention for providing automatic merchant banking services. System 10 is equipped with a rolled coin dispensing apparatus specifically provided in accordance with the present invention. The rolled coin dispensing apparatus shown in connection with system 10 is described in connection with dispensing of coin rolls. However, as also will become apparent, it may be used to dispense or vend other goods as well.

Figure 2:
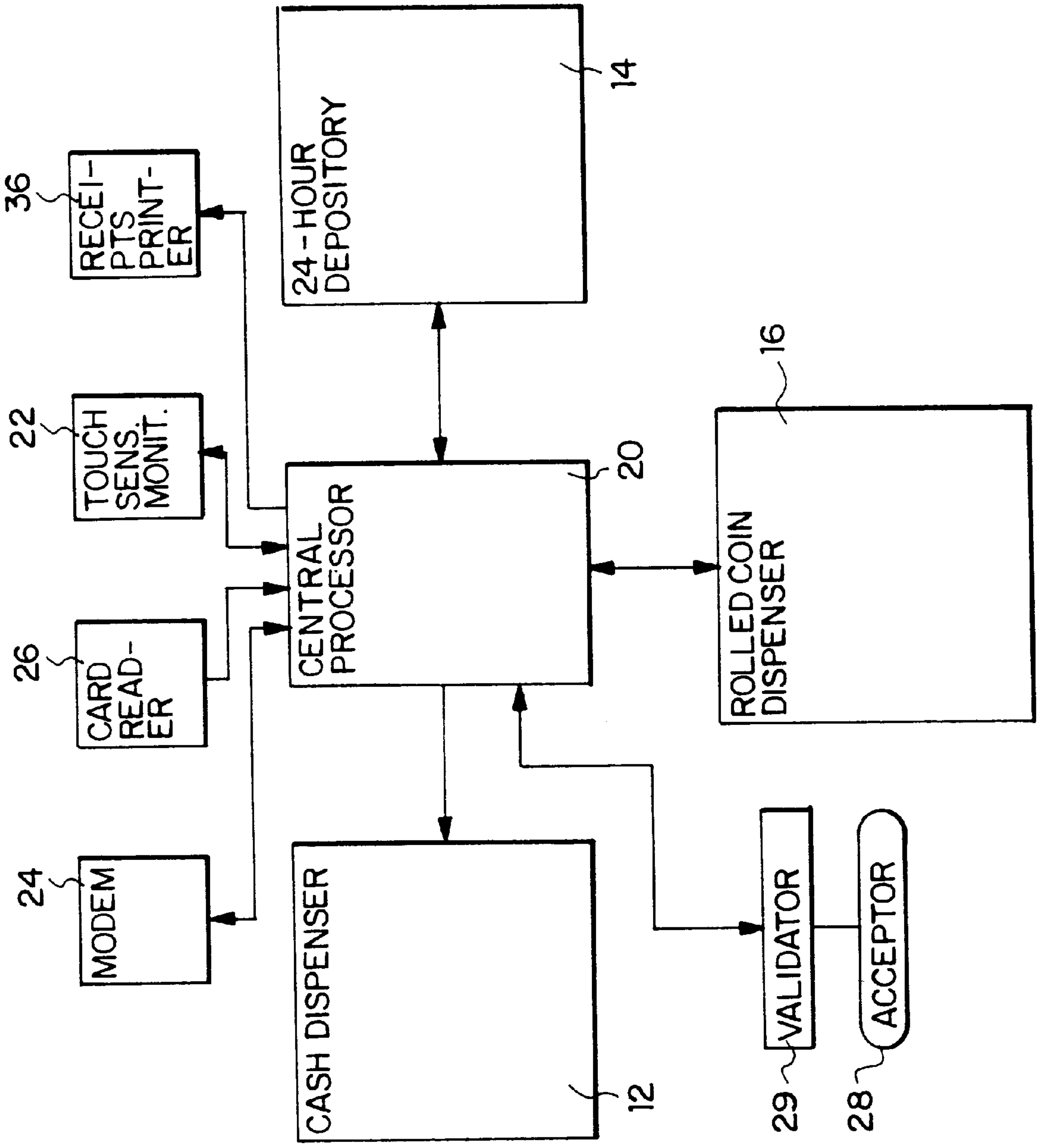
FIG. 2 is a block diagram of the system of FIG. 1.

With reference also to FIG. 2 now, system 10 includes a cash dispenser 12, a 24-hour depository 14, and the new rolled coin dispenser 16. System 10 includes a central processor 20 that receives input from a user terminal 22. System 10 also can be linked for external communication to a bank or the like by a modem 24. The central processor 20 controls all of the cash dispenser 12, the depository 14, and the rolled coin dispenser 16. System 10 provides a composite machine by which users can obtain cash and change to accommodate their cash transactions. Cash dispenser 12 and coin dispenser 16 when used in combination with the after-hours depository 14, provide full 24-hour service to merchant and other customers.

Preferably, user terminal 22 is an interactive monitor that provides output in the way of a visual display for the user and also serves as the input device by way of touch-sensor capability. The touch-sensor capability for terminal 22 comes from a touch screen 23. To the customer, terminal 22 advises of the availability of the system 10 for use, provides the instructions for use, and transaction reports. For service personnel, it provides inventory reports of coins and cash, instructions for restocking, and other reports such as reconciliations, transactions and, for fault diagnosis, test screens.

A card reader 26 accepts magnetic cards for user access and for provision of an audit trail. A note acceptor 28 receives bills to be changed. Received bills are checked by a validator 29 before coins or bills are dispensed. A currency tray 30 and a rolled coin tray 32 hold cash and coinage respectively that have been dispensed in response to user instructions. A depository door 34 accepts deposits. A receipt printer 36 provides receipts of any fees charged, and the date and time of each transaction. Service access means 38 and 40, each having a combination keypad, are provided for each of the dispensing side and the depository side of system 10. Each service access 38, 40 controls a front vault door 42.

Figure 3:
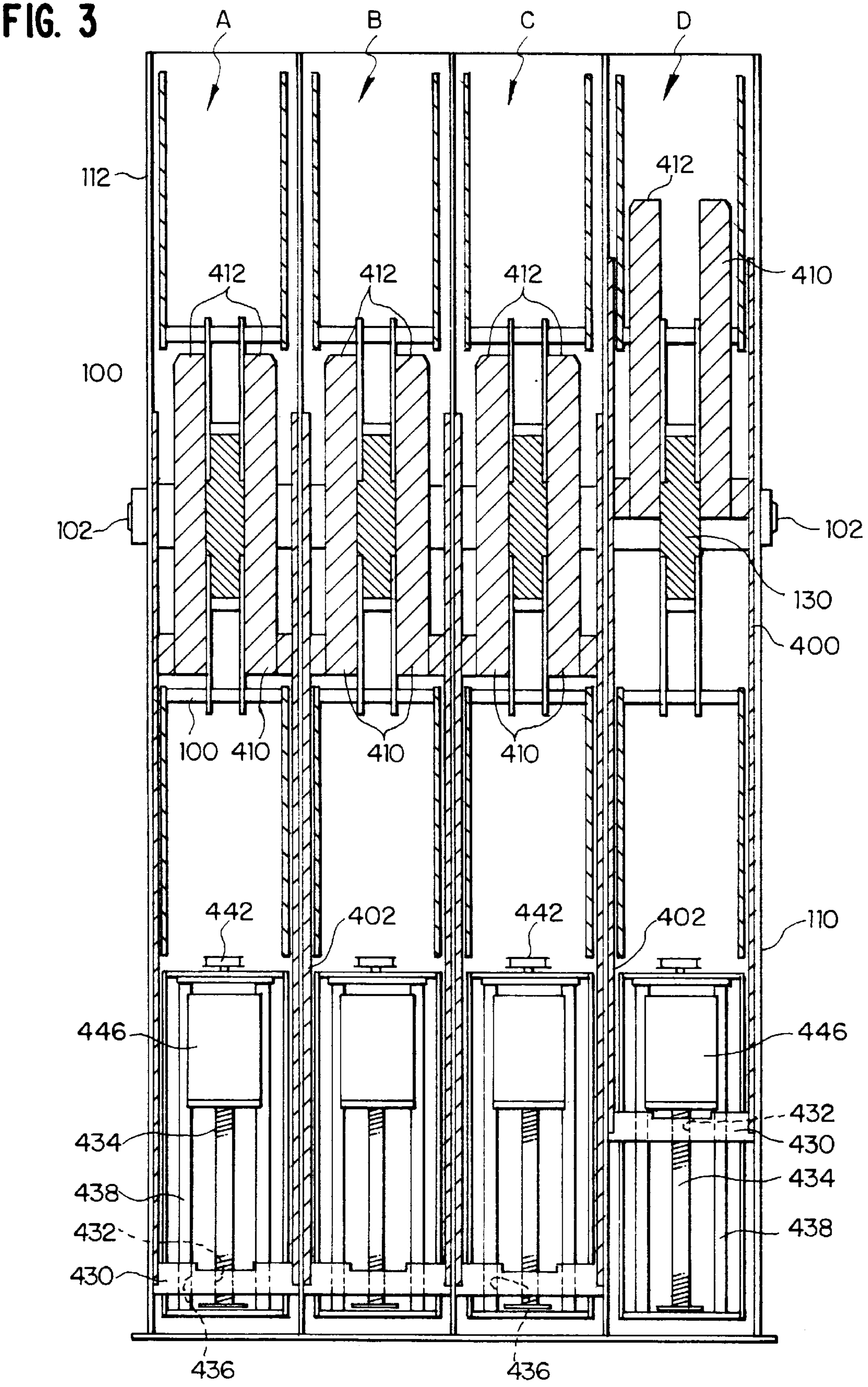
FIG. 3 is schematic, front and sectional view of major components of the rolled coin dispenser of the present invention.
Figure 4:
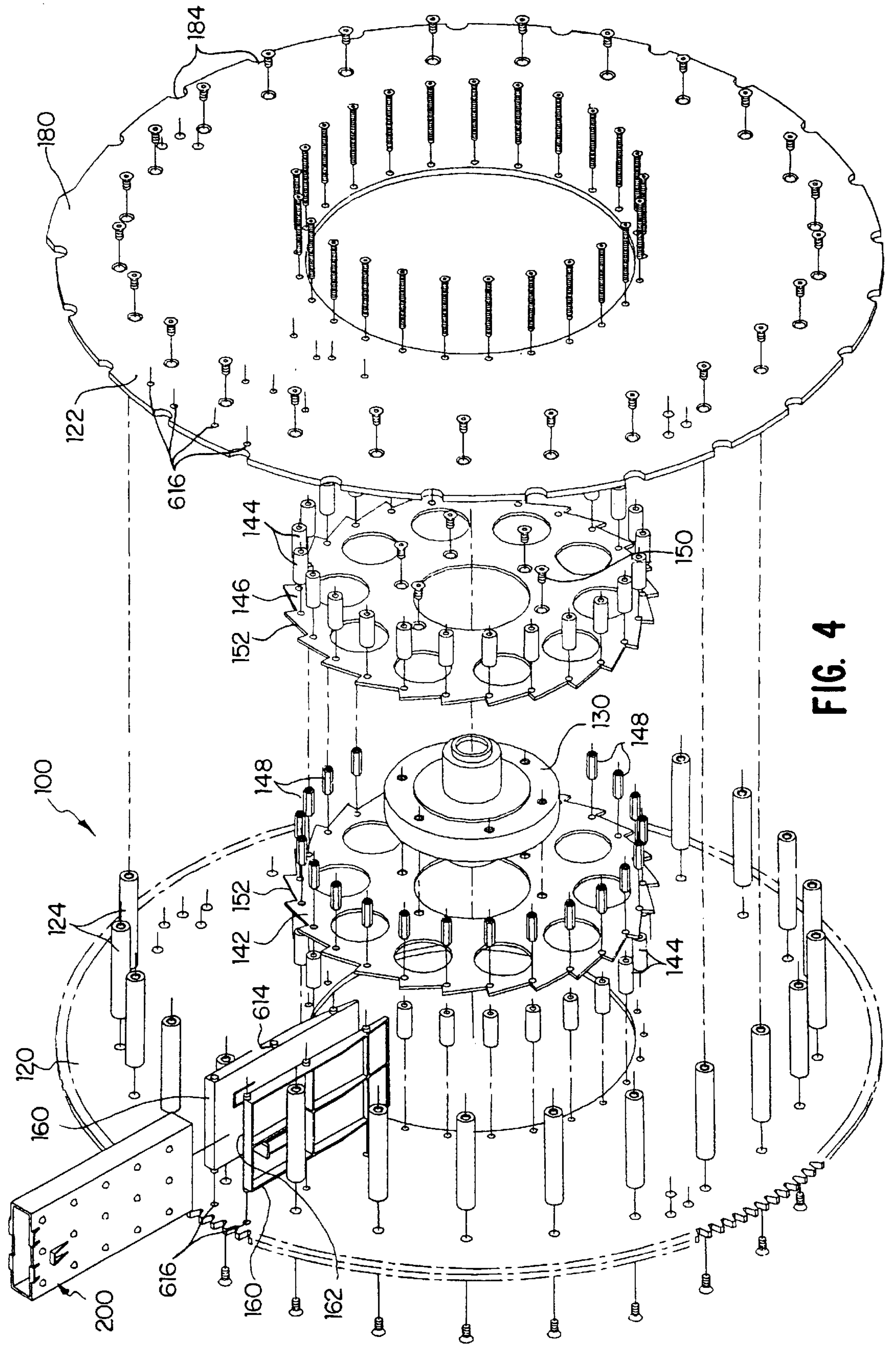
FIG. 4 is a perspective, exploded view of a dispensing or "cassette" wheel of the rolled coin dispenser of FIG. 3.
Figure 5:
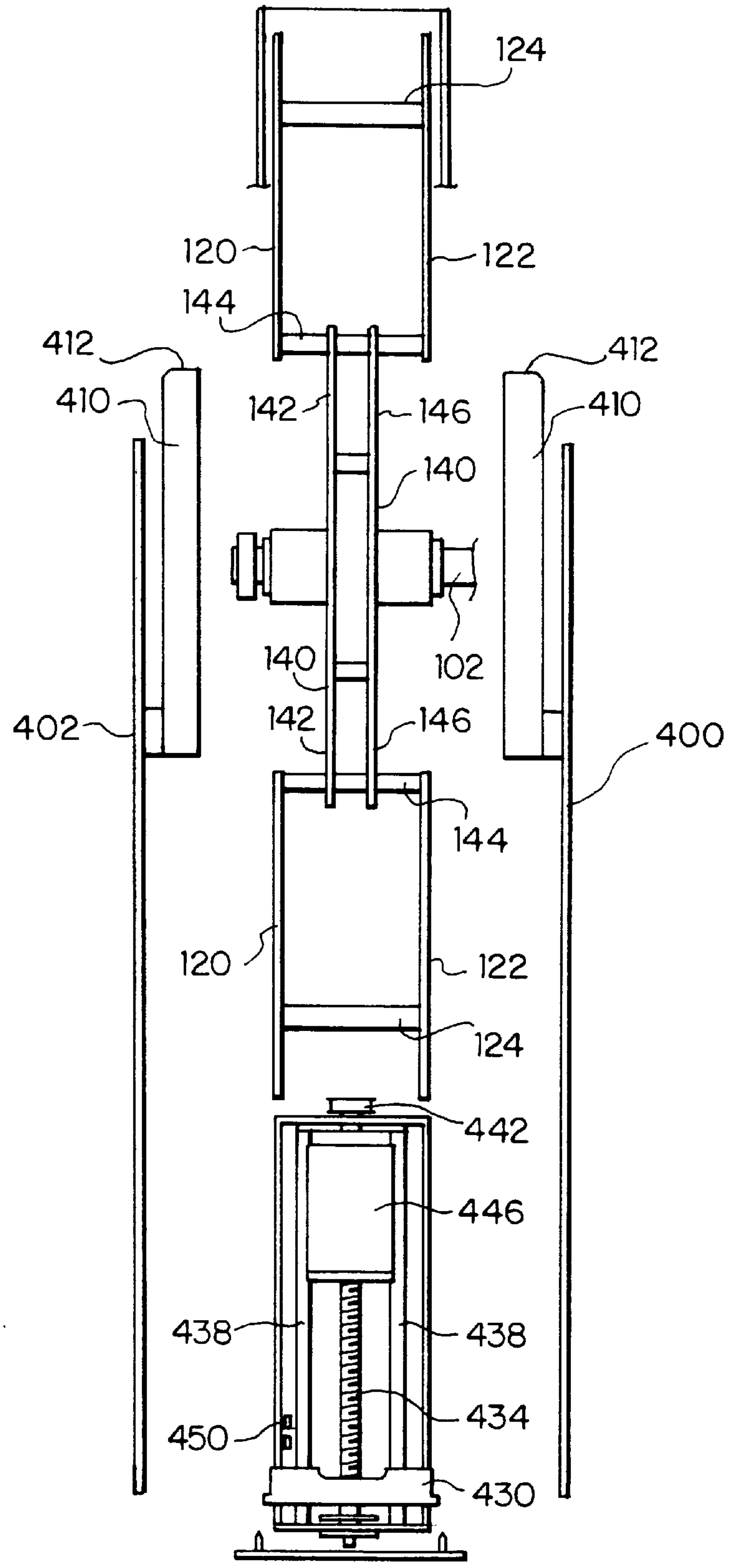
FIG. 5 is a view similar to FIG. 3, of the cassette wheel of one lane in isolation.

FIG. 3 is a schematic, front and sectional view of the structure of a preferred rolled coin dispenser 16 in accordance with the present invention. Rolled coin dispenser 16 includes four separate coin-dispensing sections or "lanes" labelled A, B, C, and D in the figure. Each lane A, B, C, D includes a dispensing wheel, hereinafter referred to as a "cassette wheel" 100 that is loadable with coin cassettes sized to hold one of quarters, dimes, nickels and pennies. FIG. 4 is an exploded, perspective view of one such cassette wheel 100, and from this figure, one can appreciate that the cassette wheel of each lane A, B, C, D generally is cylindrical. FIG. 5 is another view, similar to FIG. 3, of one such wheel in isolation. All four of cassette wheels 100 are journaled on a common axle 102 to rotate on a common axis. Cassette wheels lo will be discussed in detail, infra.

Figure 6:
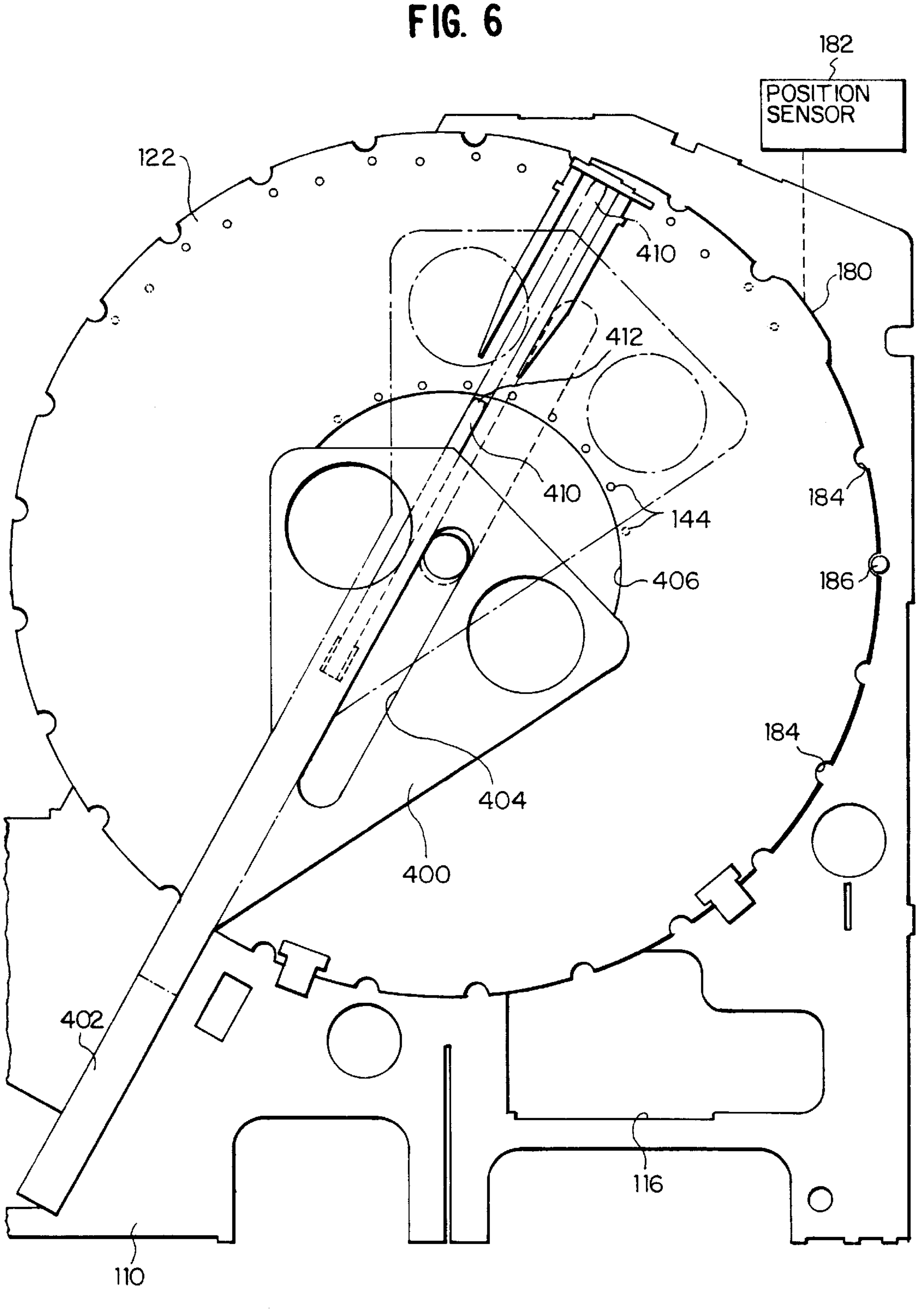
FIG. 6 is a diagrammatic side view of the cam-side of a cassette wheel in relation to a frame member and a pusher arm assembly associated with that cassette wheel.

With particular reference to FIG. 3, and also FIG. 6, a pair of side frame members 110, 112 support the four cassette wheels 100 and their common axle 102. Frame members 110, 112 are mounted to a flat base member 114. Frame members 110, 112 each include an opening for the rotational support of casset-e wheels 100. Also, for security reasons and reliability in construction, frame members 110, 112 are constructed from steel or like metal materials. As such, to reduce the weight of the overall rolled coin dispenser 16, frame members 110, 112 may have several cut-out sections 116 as can be seen from FIG. 6. FIG. 3, being a schematic view, does not show features of the top of dispenser 16. Significant features of the upper portion thereof, namely, the coin delivery elements also will be discussed, infra.

Cassette Wheel Assembly

FIGS. 4 and 5 are representative of the cassette wheel 100 shown in any of the lanes A, B, C, D of FIG. 3. Each cassette wheel 100 is defined by a pair of wheel sides referred to as the gear-side wheel 120 and the cam-side wheel 122. Gear-side wheel 120 and cam-side wheel 122 are secured together at a set spacing by a number of identical long spacer members 124 arranged in a generally circular configuration at peripheral portions of each of the gear-side and cam-side wheels.

Gear-side wheel 120 is so referred to as it is a toothed gear wheel. Cam-side wheel 122 has one cam 180 that is involved in calibration or "ZERO SET" of the wheel. During such calibration, a position sensing switch 182 (shown schematically in FIG. 6) produces a signal indicative of the passage of cam 180 thereby. Cam wheel 122 also has a plurality of alignment notches 184 located about its periphery. Alignment notches 184 also are involved in zero-setting. Calibration is done when one of alignment notches 184 aligns with an alignment hole 186 in side frame member 110.

Between gear-side wheel 120 and cam-side wheel 122 is connective structure for joining these cassette wheel sides to each other. This structure includes a hub disk 130 that receives axle 102 therethrough for rotation of cassette wheel 100. Hub disk 130 is held in place by an inner wheel structure generally labelled as 140 in FIG. 5. Inner wheel structure 140, as seen in FIG. 4, in turn includes a first ratchet-like inner wheel member 142 mounted to the interior side of gear-side wheel 120 by another plurality of spacer members 144 that, longitudinally, are shorter than spacers 124. A second ratchet-like wheel member 146 is mounted symmetric with the first such member 142, on the other side of hub disk 130. Second ratchet-like wheel 146 likewise is mounted to cam-side wheel 122 by spacers 144. The set of spacer members 144 connecting gear-side wheel 120 and inner wheel 142, and the like set of spacers 144 fixing together cam-side wheel 122 and inner wheel 146 each are arranged in a generally circular pattern having a diameter, d. Wheels 142 and 146 in turn are fixed to each other by another plurality of spacers 148 and fixed to hub disk 130 by screw fasteners 150.

Inner wheel members 142 and 146 have a saw-tooth appearance. Each "saw tooth" 152 of inner wheel 142 is aligned with an associated tooth 152 of inner wheel 146 to provide a lower support located between cassette wheel dividers 160 that are mounted between the gear-side and the cam-side wheels 120 and 122. Dividers 160 and inner wheels 142, 146 embody means for receiving tubular, generally rectangular rolled coin cassettes 200 and in particular, placing them in a space formed between each pair of such dividers. In FIG. 4, two dividers 160 are shown as mounted to the gear-side wheel 120. The rectangular coin cassette 200 slips into the slot 162 formed between the dividers 160.

Figure 7A:
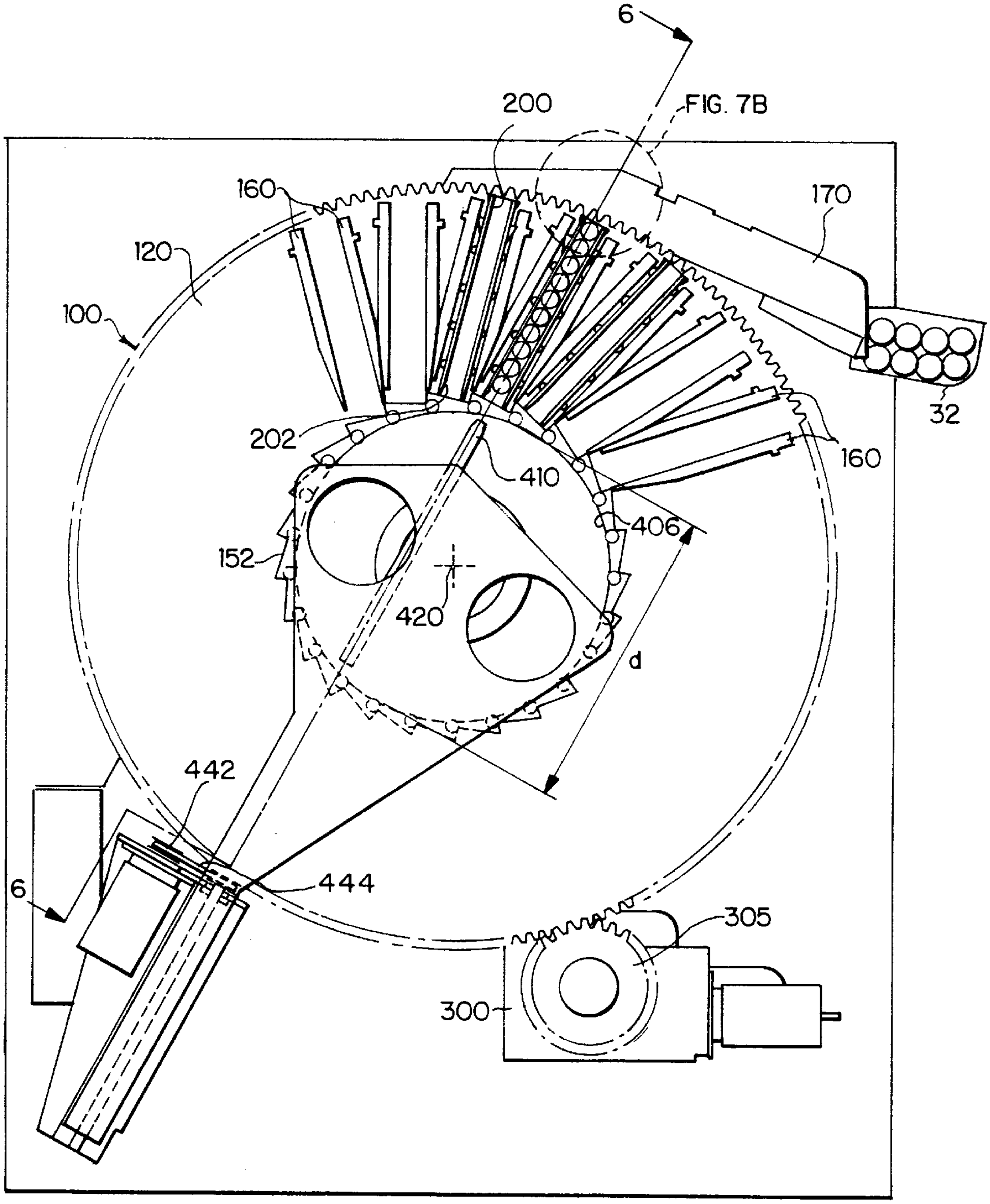
FIG. 7A is a schematic side view illustrating the manner of arrangement of cassettes, the manner of holding cassettes on the cassette wheel, and the path for delivery of dispensed coin rolls.

To simplify the drawing, FIG. 4 shows only two dividers 160 and one cassette 200. Reference also is made to FIG. 7A which shows seven pairs of dividers 160 and the relationship of each pair with the teeth 152 of inner wheels 142 and 146. FIG. 7A also is schematic in that actually there are fifty such dividers 160 arranged in twenty-five pairs to receive twenty-five cassettes 200 in the disclosed preferred embodiment. Dividers 160 all are identical. The mounting arrangement for the dividers 160 of each coincassette holder pair will be discussed in detail in the following.

Figure 7B:
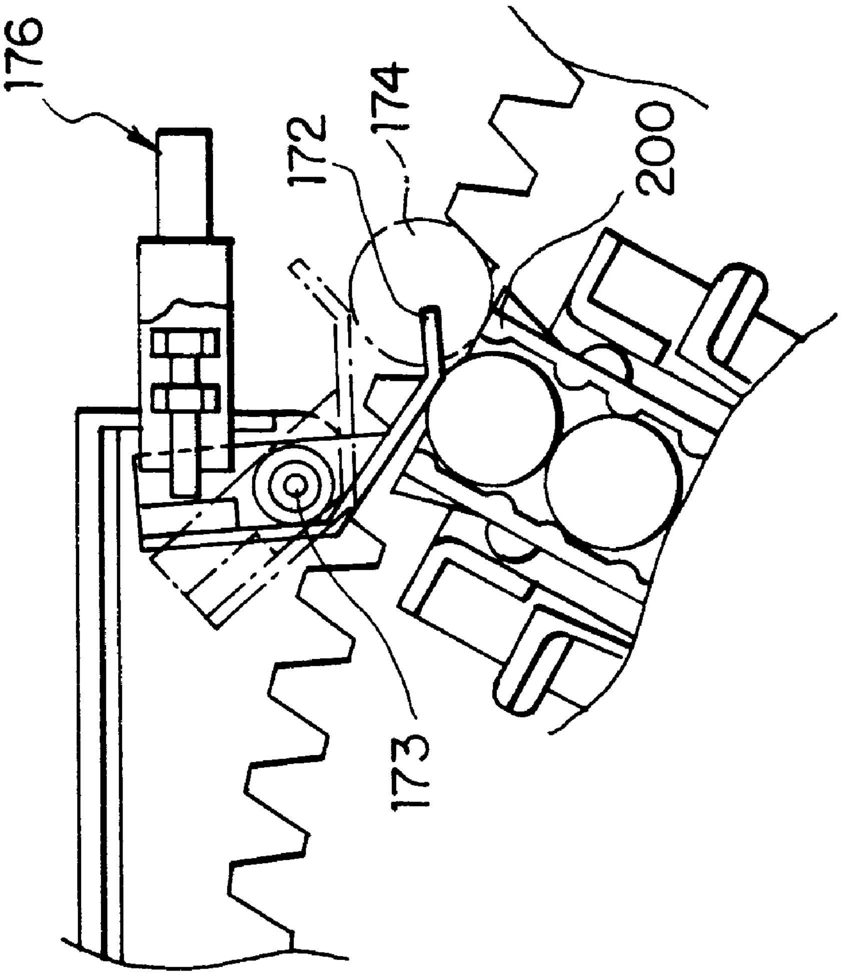
FIG. 7B is an enlarged view of the encircled portion of FIG. 7A.

FIG. 7A also depicts a coin delivery path for dispenser 16. More detail for such delivery path is given in FIG. 7B. Each lane A, B, C, D has a chute structure 170 leading to the coin tray 32 seen in FIG. 1. The coin delivery path includes a coin door 172 which opens under the force of coin rolls 174 exiting a cassette 200. In the preferred embodiments, a proximity switch 176 is associated with each coin door 172. Switch 176 is involved in a self inventory process for rolled coin dispenser 16 that will be discussed, infra. During that self inventory procedure, switch 176 detects opening of the door 172 beyond a predetermined point. According to the preferred embodiments, coin doors 172 swing about a hinge axis 173. The coin door 172 of each lane will activate its associated proximity switch 176 when it swings upwardly by approximately 5°. Proximity switch 176 detects the opening of coin door 172. It should be noted that in the preferred apparatus and method, during customer use, central processor 20 records dispensing of each roll of coins without input from switch 176. Switch 176 is monitored only for the aforementioned inventory process. However, as also will become apparent, switch 176 could be monitored during normal dispensing if this is desired.

Cassette Wheel Rotary Drive

Figure 8:
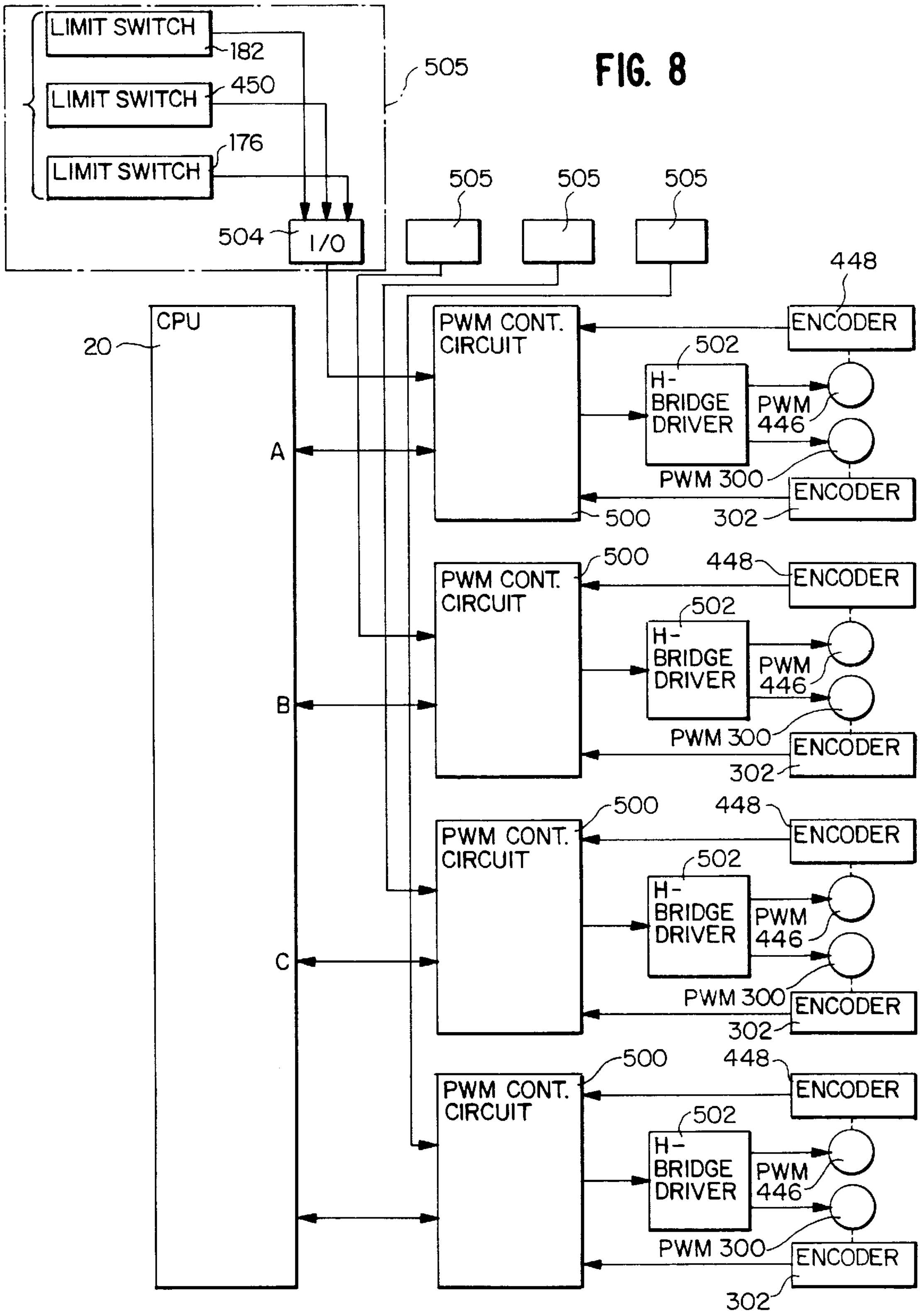
FIG. 8 is a more detailed block diagram illustrating the operative relationship of major elements for rotary drive and linear drive.

Reference now also will be made to FIG. 8. Each cassette wheel 100 independently is motor driven for alignment of cassettes 200 with chute structure 170. Preferably, the rotary drive motor 300 for each cassette wheel 100 is a pulse width motor (PWM) equipped with a rotary encoder 302. As seen from FIG. 7A, a drive pinion gear 305 connects the motor 300 and the gear-side wheel 120. In the preferred embodiments, there is a 300 to 1 ratio between motor 300 and wheel 120. For example, a 50 to 1 ratio can be provided between the motor 300 and pinion gear 305, and a 6 to 1 ratio can be provided between the pinion gear and wheel 120. At the 300 to 1 ratio, one motor rotation corresponds to a 1.2° cassette wheel rotation.

Motor encoder 302 is a conventional one-thousand line encoder arranged to generate 4,000 pulses or counts per each motor rotation. Each encoder 302 also has one relatively thicker line for generation of one "marker" pulse per motor rotation. Now with twenty-five cassettes 200 held by cassette wheel 100, there is a 14.4° angle between each adjacent two cassettes. Thus, twelve motor rotations are necessary to advance the cassette wheel 100 (12×1.2°) from one cassette 200 to the next. This corresponds to 12×4,000 or 48,000 motor-control counts. Preferably, motor 300 is controlled to advance every third cassette 200 for dispensing. This maintains a favorable disposition of weight within cassette wheel 100 as the rolled coins are dispensed. In this scenario, the motor 300 is controlled to advance for 144,000 counts to advance from one cassette to the next (third) cassette.

Mention also is made of conventional familiar step motors. Such also could be substituted for motor 300 in the disclosed embodiments. However, a pulse width motor arrangement has been preferred due to its high accuracy in movement.

Pusher Arm Mechanism

It already should be apparent that each cassette wheel 100 is rotated to position the cassette 200 under coin door 172 for dispensing of coin rolls 174. However, the preferred ejecting means or mechanism for ejecting coin rolls from the cassette has not yet been discussed in detail. We return to FIGS. 3, 6 and 7A. Each lane A, B, C, D, has two pusher arms 400 associated with it. One such pusher arm 400 is disposed on each side of each cassette wheel 100, external to the wheel. Each pusher arm 400 has an eccentric, generally triangular shape with an elongated downwardly extending portion 402. Pusher arm 400 also has an elongated, obround slot 404 through which the cassette wheel axle 102 extends. Slot 404 allows for reciprocal movement of each pusher arm 400 with respect to axle 102. Meanwhile, the generally triangular upper shape of arm 400 prevents inadvertent entry of the pusher arm into the interior of cassette wheel 100 through the center opening 406 present in both gear-side wheel 120 and cam-side wheel 122 during movement of the pusher arm. Because pusher arm 400 also preferably is made from metal, two circular cut-out sections 408 are visible in the depicted arm to reduce the overall weight of the arm. This becomes significant when it is considered that eight such pusher arms 400 are required corresponding to the four rolled coin lanes A, B, C, and D.

Figure 9:
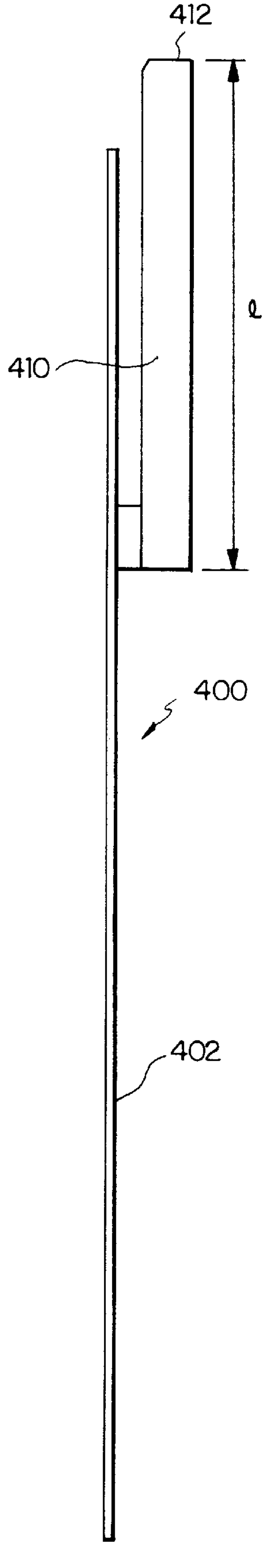
FIG. 9 is an isolated, downwardly-looking view of a pusher arm and ejector bar for each of the cassette wheels of FIG. 3.

Pusher arms 400 themselves do not contact the coin rolls 174 in coin cassette 200. Rather, this is accomplished by ejector bars 410, one such ejector bar being mounted to each pusher arm 400. FIG. 3 provides a frontal view of all eight ejector bars 410 present in preferred coin dispenser 16. FIG. 9 shows a side view of an ejector bar 410 in combination with its pusher arm 400. As seen, each ejector bar 410 generally is rectangular with a basically flat contact face 412 for contacting and ejecting coin rolls from a coin cassette 200. Each ejector bar 410 has a longitudinal length, l, that is less than the diameter, d, of the inner wheels 142, 146 and indeed less than the diameter of the circle defined by inner wheel spacers 144 (FIG. 7A). Also, with reference again to FIG. 7A, each cassette 200 has a lower opening 202 for the purpose of admitting the ejector bars 410 therethrough and so the ejector bars are proportioned smaller than that opening.

Each ejector bar 410 is affixed to its respective pusher arm 400 so that it is located within the cassette wheel 100 when the arm is positioned alongside the wheel. FIG. 3 makes clear that for each cassette wheel 100, one ejector bar 410 thus is located between cam-side wheel 122 and its adjacent inner wheel 146, and another such bar 410 is located between gear-side wheel 120 and its adjacent inner wheel 142. The opening 406 in each of gear-side wheel 120 and cam-side wheel 122 admits an ejector bar 410 for easy assembly (and, also further reduces the overall weight of coin dispenser 16 by reducing the amount of material making up the gear-side and cam-side wheels 120, 122). The longitudinal length, l, of the ejector bars 410 allows the pusher arms 400 to retract them to within the diameter, d, defined by spacers 144 when the pusher arms are fully retracted. When fully retracted, ejector bars 410 are clear of the cassette wheel structure and it is only when pusher arms 400 retract ejector bars 410 to this fully retracted position that the cassette wheels 100 can be rotated. When a cassette wheel 100 stops, its associated pusher arms 400 can be extended to move their respective ejector bars 410 into a selected cassette 200 in order to eject a selected number of coin rolls 174 therefrom.

With reference also to FIG. 7A again, line 6—6 extends longitudinally through ejector bar 410 and one of the loaded cassettes 200. The cassette shown immediately below coin door 172 has a longitudinal axis coinciding with the longitudinal axis 6—6 of ejector bar 410. It is referred to as in the dispense position. Axis line 6—6 is offset from the center 420 of dispensing wheel 100, so that it is tangent to an imaginary circle having concentricity with center 420. This is so that ejector bar 410 freely passes along side of the dispensing wheel axle 102 without conflict with the axle. Indeed, in the preferred embodiments, each ejector bar 410 is aligned in parallel with and offset from the travel slot 404 in each pusher arm 400.

It further follows that dividers 160 are mounted on dispensing wheel 100 such that each cassette 200 comes into the same coinciding longitudinal alignment with the longitudinal axis 6—6 of ejector bar 410 as each cassette is rotated into the dispense position. As such, none of the dividers 160 are arranged radially from the cassette wheel center 420. Rather, they all are situated to position their respective cassettes in the disclosed alignment with ejector bar 410 when the cassettes are brought into the dispense portion.

Pusher Arm Linear Drive

At their opposite ends, the two pusher arms 400 of each lane connect to a linear drive mechanism for reciprocal extension and retraction. As best seen in FIGS. 3 and 7A, pusher arms 400 are coupled to a generally rectangular actuator plate 430 that moves them in tandem. Actuator plate 430 has a central threaded opening 432 corresponding to the threads of a drive screw 434. The plate 430 also has openings 436 on either side of threaded opening 432 for receipt of cylindrical guide shafts 438 therethrough. In the preferred embodiment, two pulleys 442 and a belt 444 transfer driving force from a separate pulse width motor (PWM) 446 to turn screw 434 and selectively raise and lower actuator plate 430 and the pusher arms 400 coupled thereto.

Motor rotation of each pusher arm motor 446 also is monitored by an encoder 448. As in the cassette wheel drive scheme, the encoder 448 associated with each pusher arm motor 446 generates 4,000 count pulses for motor control, and also one marker pulse per motor rotation. The counts are the basis for precise control over the extension and retraction of the pusher arms 400. Alternatively, as also discussed in connection with cassette wheel drive, other motor arrangements such as a step motor could be used for pusher arm movement. In FIG. 3, lane D is depicted as operative while lanes A, B, and C are in retracted condition. That is, in lane D, pusher arms 400 have been driven upwardly by their drive mechanism for coin roll ejection.

Central Control

Attention again is directed to FIG. 8. FIG. 8 is a high level diagram for illustrating the control path for each of lanes A, B, C, and D. Central processor 20 communicates with a pulse width modulation control circuit 500 assigned to each of the two pulse width motors 300, 446 included with each lane. Each control circuit 500 is connected to a conventional motor drive circuit 502, preferably a H-Bridge driver, which in turn is connected to the motor to be controlled. Each motor 300, 446 is shown in relation to its respective encoder 302, 448 which provides feedback to the control circuit 500. Each control circuit 500 also receives input from a position signal providing block 505. Block 505 is seen to connect its associated dispensing wheel limit switch 182, pusher arm limit switch 450, and coin door proximity switch 176 through an input/output (I/O), interface 504 to each control circuit 500.

The limit switch 450 is associated with each pusher arm 400. Limit switch 450 is positioned to register full retraction of its associated arm 400 and may be arranged to be triggered by the arm, the actuator plate 430, or in any other way apparent to those of ordinary skill in the art. Like limit switches 182, limit switches 450 are involved in calibration or "ZERO SET" of pusher arms 400.

Coin Cassettes

Figure 10:
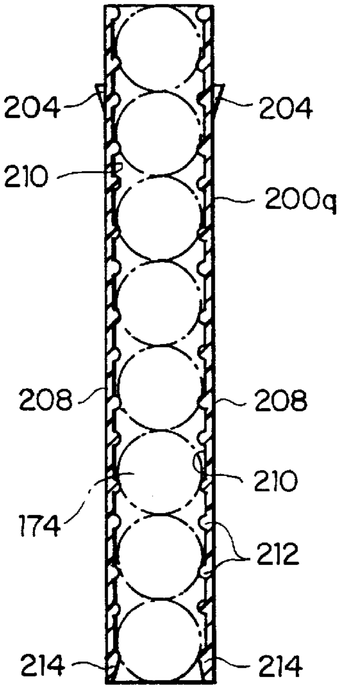
FIG. 10 is a side-sectional view of a rolled quarter cassette in accordance with the present invention.
Figure 11:
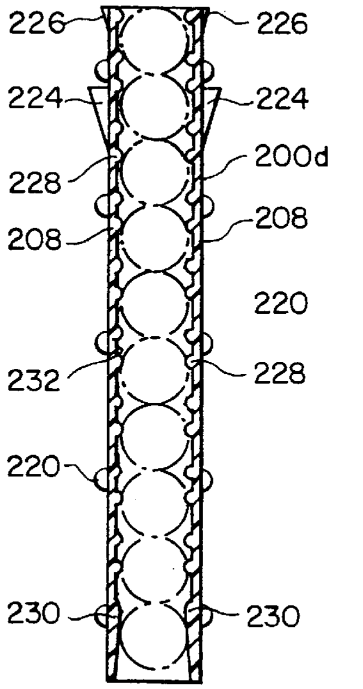
FIG. 11 is a side-sectional view of a rolled dime cassette in accordance with the present invention.
Figure 12:
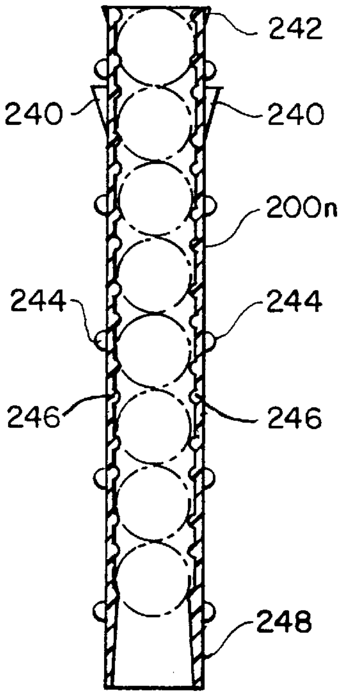
FIG. 12 is a side-sectional view of a rolled nickel cassette in accordance with the present invention.
Figure 13:
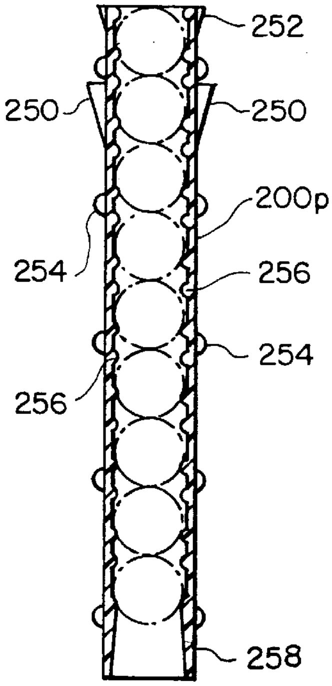
FIG. 13 is a side-sectional view of a rolled penny cassette in accordance with the present invention.

With reference to FIGS. 10–13, each of the cassettes 200 for quarters (200*q*), dimes (200*d*), nickels (200*n*), and pennies (200*p*) are shown. FIG. 10 shows the preferred cassette 200*q* dedicated to holding rolls of quarters. FIG. 11 shows a preferred cassette 200*d* dedicated to rolls of dimes. The cassette 200*n* of FIG. 12 holds rolls of nickels. FIG. 13 shows an exemplary cassette 200*p* for holding rolls of pennies. In the preferred embodiments, all of cassettes 200 have a generally rectangular, tubular, plastic body with the same longitudinal length. Each of dividers 160 likewise has a same longitudinal length that is somewhat less than that of the cassettes 200. However, for simplicity in manufacture, it is contemplated that the spacing between each parallel cassette-holder divider pair be the same irrespective of whether the cassette wheel 100 is to be loaded with cassettes for quarters, dimes, nickels, or pennies. As such, the cassettes 200 themselves must adapt to the fixed spacing between cassette-holder divider pairs. The advantage to the adaptation by the cassette is that all of cassette wheels 100 can be the same, and that any cassette wheel can be loaded with rolled coins of any denomination. Indeed, from this, it is appreciated that cassette wheels 100 can dispense U.S. coinage or that of other countries merely by appropriately adapting the cassettes to the coins to be dispensed.

In detail, we first look at cassette 200*q* shown in FIG. 10. The longitudinal (radial) length of cassette 200*q* dimensions it to contain up to eight rolls of quarters. It has retainer members 204 on either side for engaging with one shoulder 206 of each cassette-holder pair of dividers 160. Otherwise, cassette 200*q* has smooth outside walls 208. Cassette 200*q* is open at its top and its bottom. Its interior walls 210, seen in FIG. 10, each have ribs 212 for horizontally positioning the quarter rolls within the cassette. That is, the longitudinal axis of each quarter roll (not indicated) is substantially perpendicular to the axis 6—6 of the ejector bar 410 when the quarter cassette 200*q* is in the dispense position. Bosses 214 at the cassette bottom prevent the rolls from falling out of the cassette 200*q* during handling and when the cassette is deployed in the wheel 100. Bosses 214 have a ramp-like profile. This profile aids in loading coin rolls through the bottom of cassette 200*q* while preventing already loaded rolls from falling out.

Cassette 200*d* for dimes has the same length as quarter roll cassette 200*q* but a different width corresponding to the diameter of dimes. To fit between a cassette-holder divider pair, dime roll cassette 200*d* has ribs 220 on its outer walls 208 seen in FIG. 11. Outer ribs 220 effectively give dime cassette 200*d* the same width as quarter cassette 200*q*. To reach shoulders 206 of the divider pair, dime roll cassette 200*d* has visibly larger retainer members 224 than quarter cassette 200*q*. It also has filler portions 226 for engagement with the dividers 160 which support it. Portions 226 thus prevent a gap between outer walls 208 and dividers 160 at the top of cassette 200*d* when the cassette is in place within a cassette wheel 100. It has been found that portions 226 happen to be easily finger graspable for removal of a spent cassette. (As such, if desired, such filler portions also could be added to quarter cassette 200*q*.) Cassette 200*d* likewise has interior wall ribs 228 arranged in pairs as shown in order to support the dime rolls therewithin. Bosses 230 at the lower portions of the interior walls 232 likewise prevent the coin rolls from falling through the cassette 200*q*. The ramp-like profile of bosses 230 in dime cassette 200*d* is more pronounced than for cassette 200*q*.

Each of rolled nickel cassette 200*n* and rolled penny cassette 200*p* includes appropriately dimensioned retainer members 240, 250 and filler portions 242, 252. Each likewise has outer ribs 244, 254 for proper proportioning within cassette-holder divider pairs. Interiorly, nickel cassette also has arranging ribs 246 as does penny cassette with ribs 256. Each has bottom bosses 248, 258.

Dividers

Figure 14:
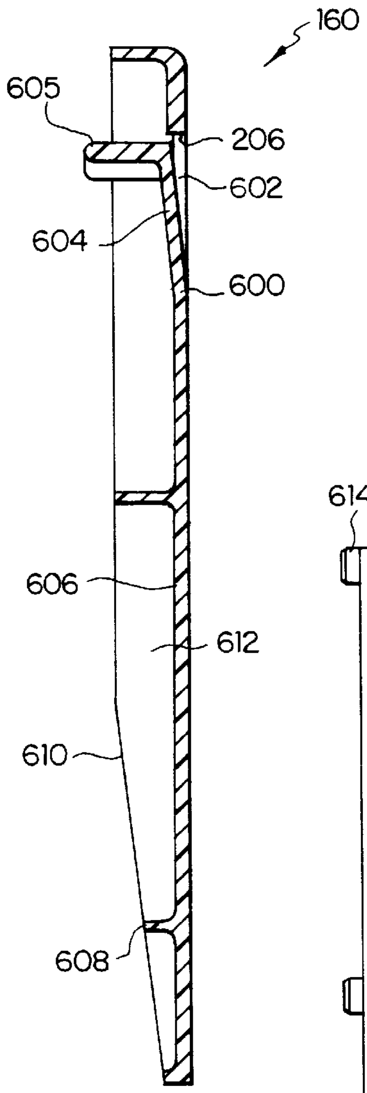
FIG. 14 is an upwardly-looking plan view of a cassette wheel divider from underneath the divider.
Figure 15:
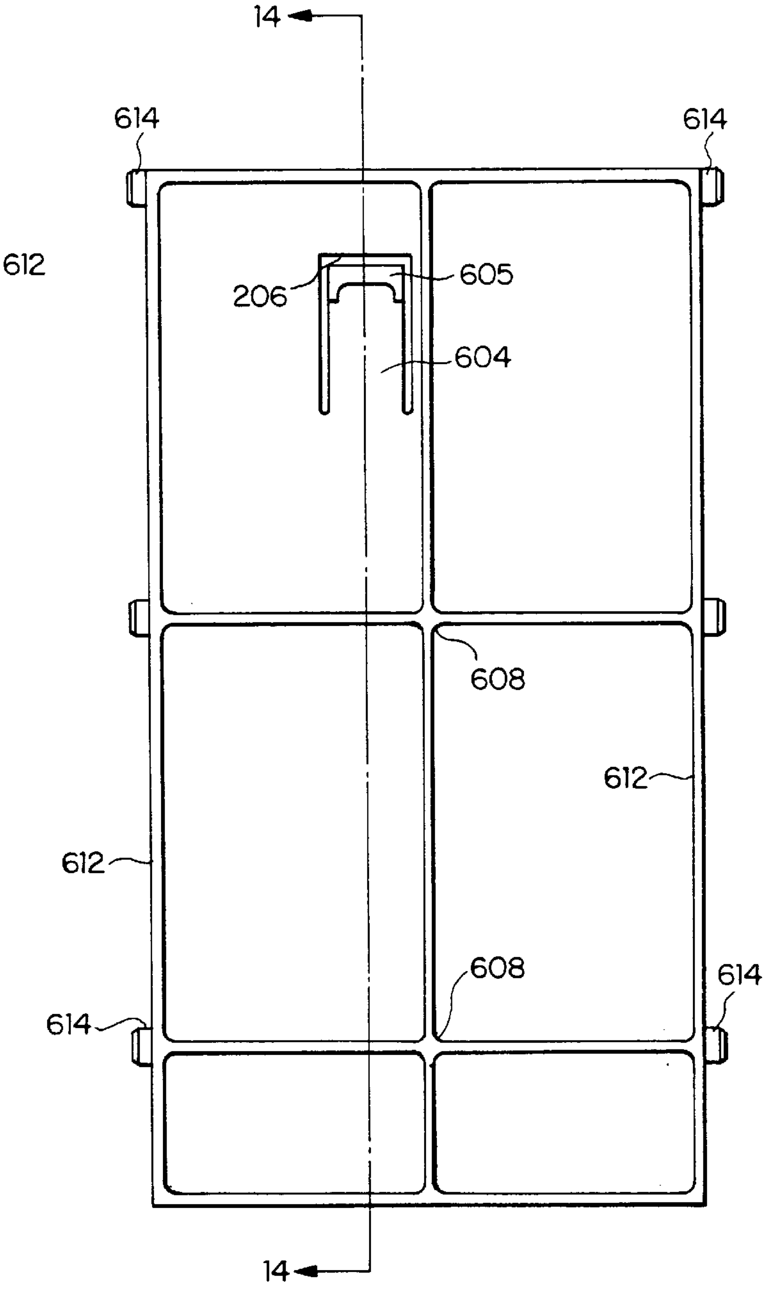
FIG. 15 is a side view of the divider of FIG. 14.

A divider 160 is shown in isolation in FIGS. 14 and 15. Preferably, dividers 160 are made from plastic. Each divider has a support face 600 that faces and contacts the received coin cassette 200. Support face 600 generally is flat so that the opposing support faces of each cassette-holder pair are arranged in parallel planes. At its central upper portion, the support face has a slot 602 formed by a withdrawn tongue portion 604 terminating in a finger grip portion 605. The upper edge of slot 602 thus provides shoulder 206 for receiving a retainer member e.g. 204, 224, 240, 250 of an inserted cassette. Tongue portion 604 is flexible. Thus, finger-grip portions 605 may be grasped by a user to push the tongue portion 604 against the retainer member of a cassette to release the cassette for removal.

Each divider member 160 also has an obverse side 606 which may be open and have a rib structure 608 as shown in connection with the preferred embodiments. The rib structure 608 strengthens the divider. As seen, the rib structure 608 also inclines from a point off center from the longitudinal midpoint of the divider 160 toward the lower portion thereof. Thus, as shown, whenever the inclined portion 610 of two dividers 160 of adjacent cassette-holder pairs meet, the contacting dividers form an angle between them to permit each pair of coin cassette-holder dividers to maintain the parallel orientation for their support faces 600.

The two opposite side portions 612 of each divider 160 each have cylindrical, chamfered protrusions 614. Mounting holes 616 in each of gear wheel 120 and cam wheel 122 correspond with divider protrusions 614. In the preferred embodiments where dividers 160 are formed of plastic, protrusions 614 simply snap into holes 616 for mounting of the dividers between wheels 120 and 122.

As one proceeds counterclockwise about a cassette wheel 100, one should note that one divider 160 of each cassette-holder pair is mounted such that it is located just above the uppermost tip of an associated pair of inner wheel teeth 152. Then the mate of each such divider pair is mounted at a position offset upwardly with respect to the next such tooth (in the counterclockwise direction). Meanwhile, the inclined portions of the rib structure 608 of each adjacent divider pair contact as shown.

Operation

Operation of the inventive apparatus now will be explained. For this explanation, assume first that a roll of quarters is to be dispensed. Assume further that the cassette wheel 100 of lane A contains cassettes 200*q* pre-loaded only with rolled quarters.

Figure 16:
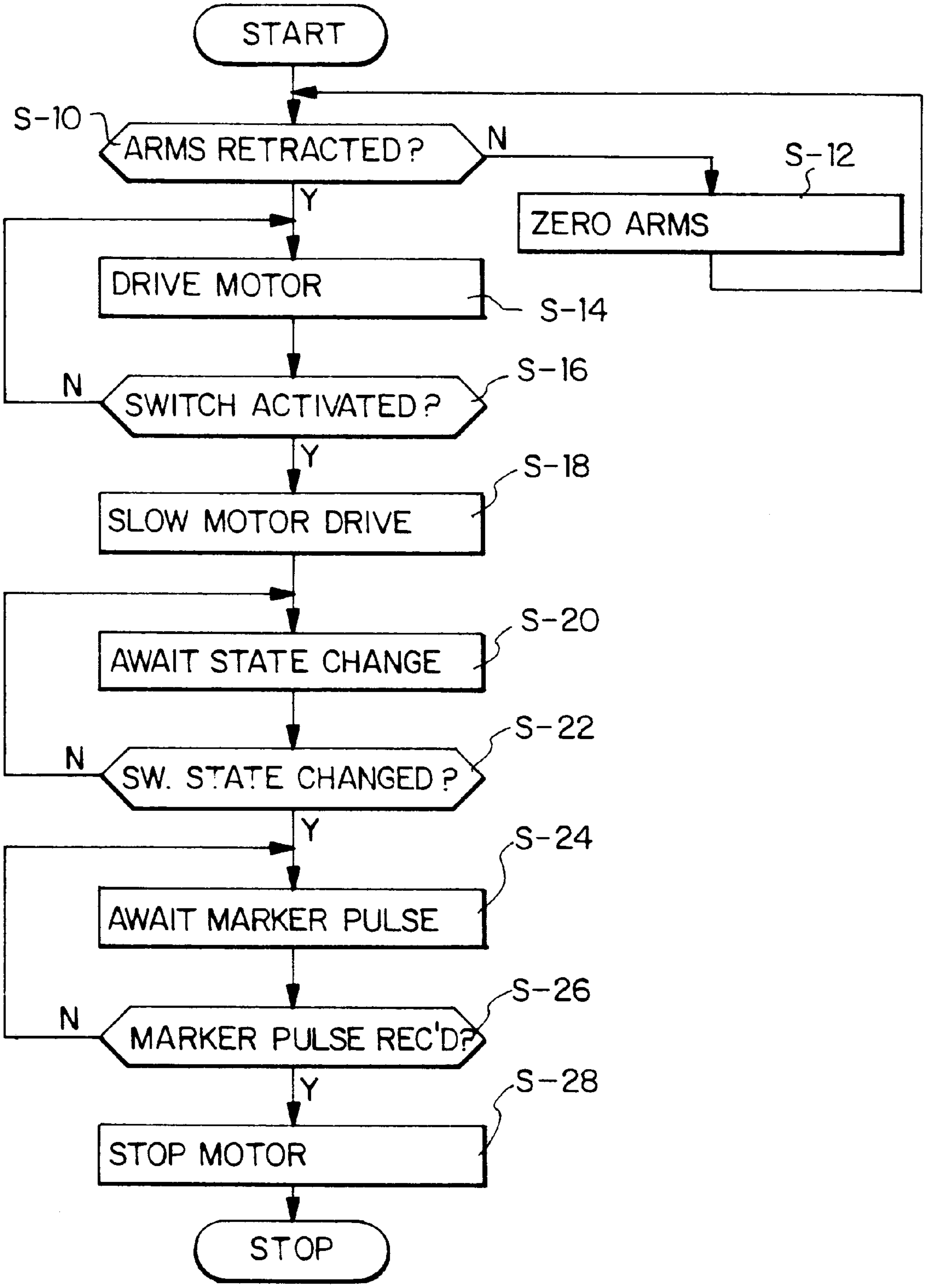
FIG. 16 is a flowchart illustrating calibration for the cassette wheel rotary drive.

To ensure that the cassette wheel 100 will stop at the proper position for dispensing, a "ZERO SET" procedure is contemplated for the cassette wheel. In this regard, reference is made to the flowchart of FIG. 16. As seen from the flowchart, "ZERO SET" for the cassette wheel axis 102 is not to be performed until after the pusher arms 400 are fully retracted. In step S-10, determination is made as to whether the pusher arms 400 have been retracted. If not, arms 400 are retracted fully in step S-12 and return is made to step S-10. When the arms 400 are retracted, in step S-14, motor 300 is driven to rotate the cassette wheel 100 counterclockwise. In decision step S-16, it is determined whether cam 180 has tripped limit switch 182 to change the state of the switch. Once switch 182 has detected cam 180, motor 300 is driven at a slower speed, continuing rotation of cassette wheel 100, according to step S-18. Thereafter, while waiting with the motor 300 operated relatively slowly in step S-20, sensing is made to determine when switch 182 changes state after cam 180 moves past the switch in step S-22. Thereafter, the next marker pulse occurrence is awaited in steps S-24 and S-26. When the marker pulse arrives, processor 20 ensures that such the marker pulse is memorized, and thereafter, the motor 300 is stopped in step S-28. At this time one of alignment notches 184 should be aligned with alignment hole 186. If there is misalignment between the notch 184 and hole 186, then manual adjustment of the cassette wheel to place them in proper alignment is performed accordingly. When one of notches 184 properly is aligned with one of hole 186, one cassette 200 should be at the proper dispense position. After this procedure has been performed, cassette wheel 100 is in a "zero" position.

Figure 17:
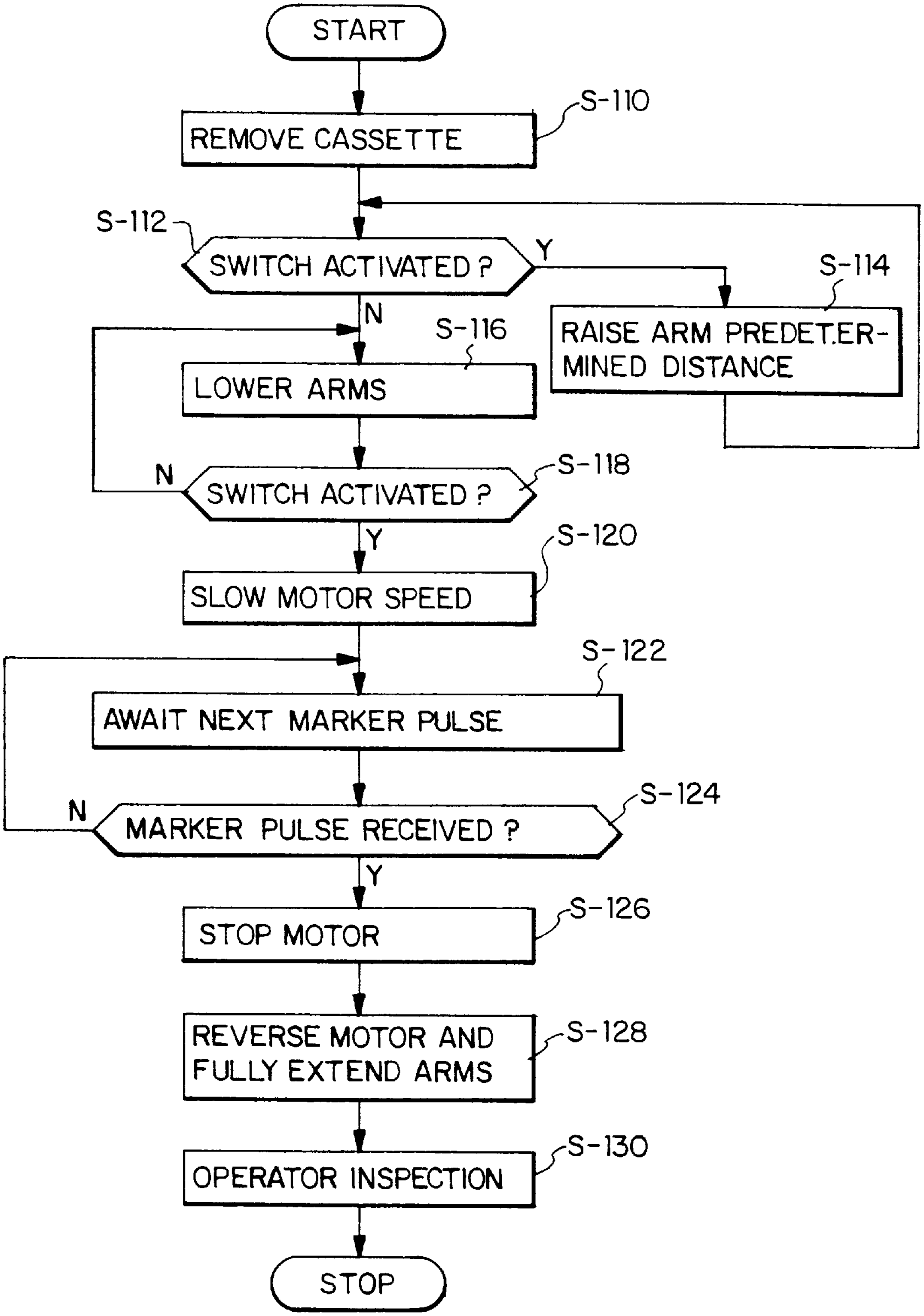
FIG. 17 is a flow chart illustrating calibration for the pusher arm linear drive.

The flowchart of FIG. 17 shows a "ZERO SET" procedure for the pusher axis. For this procedure, if there is a cassette from the cassette-holder divider pair positioned below the coin door 172, the cassette is removed therefrom (step S-110). To "ZERO SET" any pusher arm pair, first, determination is made in step S-112 as to whether the limit switch 450 has been tripped to indicate that the arms 400 fully are retracted. If arms 400 already have triggered switch 450, they are raised a predetermined distance in step S-114. Thereafter, the switch 450 will return to its unactivated state and advance is made to step S-116 where arms 400 are lowered. Again in step S-118, change of state of switch 450 is awaited. Once this occurs, the motor lowering speed is reduced in step S-120 and the next marker pulse is awaited in step S-122. Detection of she next marker pulse is indicated by step S-124. When the next marker pulse is received, it is recorded in system memory and the motor 446 is stopped in step S-126. Then, the motor 446 is reversed and pusher arms 400 are extended fully in step S-128. Then, in step S-130, an operator inspects to ensure that the pusher contact face 412 is flush with the top of the cassette holder pairs. If not, operator adjustment of the position of motor 446 and switch 450 can be made to ensure that the number of counts corresponding to full extension actually aligns contact face 412 with the top of the cassette holder pair located at the dispense position.

Continuing with the example of dispensing of rolled quarters, from the foregoing, it is noted that each motor revolution corresponds to 4,000 encoder counts. According to a commercial embodiment, a first predetermined number of 38,400 encoder counts corresponds to movement of the pusher arm 400 and ejector bar 410 by 0.960 inches. This is the incremental distance necessary for dispensing a next roll of quarters after a first roll of quarters already has been dispensed. Also, it is contemplated that there is an initial distance over which the pusher arm 400 must move before its ejector bar 410 comes into contact with the first of the eight rolls of quarters. In the same commercial embodiment, this initial distance is covered by moving pusher arm 400 for a second predetermined number of 37,080 counts. Thus, to dispense the first roll of quarters, the pusher arm 400 is moved for a total distance of 1.887 inches corresponding to 75,480 encoder counts (37,080 initial distance counts plus 38,400 incremental distance counts). Then, to dispense the second roll of quarters, the pusher arm 400 is moved only by the incremental distance of 0.960 inches corresponding to the first predetermined number 38,400 of encoder counts. In this way, the second roll of quarters will be dispensed upon reaching 113,880 encoder counts corresponding to 2.847 inches. Likewise, the third roll of quarters will be dispensed as the encoder counts 152,280 counts corresponding to 3.07 inches. Registration of count number and control over motor 446 according to the number of counts is carried out by control processor 20 and control circuit 500 according to any conventional algorithm.

It is contemplated that an "offset" distance be used in controlling the linear movement of pusher arms 400. That is, once each arm pair has been "ZERO SET", controller 20 and the pair's control circuit 500 would advance the arms 400 a short distance above the zero position. This requires that the length, l, of ejector bars 410 be configured to allow them to withdraw fully within diameter, d, of inner wheel spacers 144. Control over the advancement of pusher arms 400 would take into account the offset distance, in a way now well appreciated by those of ordinary skill in the art. The advantage in the offset manner of operation is to avoid excessive wear on proximity switches 450 by routinely stopping arms 400 above the switches.

Similar operation as described in connection with quarter rolls also is performed for rolls of dimes in cassette 200*d* of FIG. 11. In the case of dime rolls and cassette 200*d*, there also is an incremental distance for ejection of a next roll of dimes after the first such roll. The "incremental" distance corresponds to a first predetermined number of encoder counts. For the pusher arm 400 to move the ejector bar 410 into contact with and eject the first dime roll requires movement over an initial contact distance given by a second predetermined number of counts and then the increment distance. As such, after the ejector bar 410 has dispensed the first roll of dimes, pusher arm 400 is advanced in multiples of the incremental distance according to the monitored number of counts in order to dispense successive rolls of dimes. As seen from FIG. 11, cassette 200*d* is arranged to contain ten such dime rolls.

Cassette 200*n* of FIG. 12 holds eight rolls of nickels. Cassette 200*p* of FIG. 13 holds nine rolls of pennies. To eject the first of the eight rolls of nickels, pusher arm 400 likewise is advanced for the initial contact distance and the incremental distance corresponding to a summation of the first and the second predetermined number of counts. From then on, the pusher arm 400 is advanced at increments corresponding to the first predetermined number of counts for each of the remaining seven rolls. Similarly, pusher arms 410 are advanced in order to dispense the first of the nine rolls of pennies, and thereafter, advanced by increments in order to dispense the next eight rolls.

A preferred inventory procedure provides an inventory report for the number of coin rolls in each cassette of each cassette wheel 100, and the entire number of coin rolls available within coin roll dispenser 16. The preferred inventory process applies a table for associating predetermined ranges of movement of pusher arm 400 before coin door proximity switch 176 senses opening of the coin door 172 by about 5° under the force of coin rolls pushed toward dispensing by ejector bar 410. Using the same commercial embodiment distances and count numbers discussed in connection with quarter roll dispensing, we discuss the inventory of quarter rolls. Here, for instance, controller 20 will determine an inventoried cassette as containing eight rolls if after leaving its fully retracted or zero position and before pusher arm 400 moves 50,240 counts, door proximity switch 176 senses opening of the door. In this example, seven quarter rolls would be determined if sensor switch 176 detects door opening after pusher arm moves more than 50,240 counts and less than 88,640 counts. A similar process with appropriate count values is performed for cassettes with dimes, nickels and pennies.

Conclusion

A commercial embodiment of the present invention dispenses rolled quarters at a very high rate. Its dispensing rate reaches one roll per second, per cassette wheel. It is seen that the cassette wheels 100 and the respective pusher arms 400 are driven under power and do not rely upon gravity for dispensing. Thus, the rolled coin dispenser 16 avoids jams which hamper operation in conventional coin dispensing machines. The individual cassettes 200 may be loaded with coin rolls at a site different from the rolled coin dispenser 16. Hence, on-site service time can be reduced significantly at each restocking service call. The self-inventory capabilities of the rolled coin dispenser in accordance with the present invention further reduce the time necessary for on-site servicing. The self-inventory process can be controlled remotely. Also, as mentioned, identical cassette wheels 100 can be made to hold any coin denomination and coins of other countries by arranging the cassettes 200 as discussed herein. Further, the dispenser 16, while disclosed as vending coins, can dispense other goods where dispensing or vending under power, rather than by gravity, is desired. Dispenser 16 is advantageous in having a circular structure, namely wheels 100, for holding objects to be dispensed. As compared to vertical vending machines that rely on gravity for dispensing, the circular dispensing wheels 100 greatly reduce the amount of space required for storage of the goods to be dispensed.

It is to be understood that there can be various changes and/or modifications to the preferred embodiments of the present invention disclosed herein. These changes and/or modifications may be made by one of ordinary skill in the art. However, all such changes and/or modifications still would result in an arrangement well within the scope of the invention as set forth in the claims.

What is claimed is:

1. A dispensing apparatus comprising:

a dispensing wheel for holding objects, said dispensing wheel being rotatable along an axis;

a frame supporting said dispensing wheel, said frame defining a dispensing location, said axis extending horizontally through said frame;

rotary drive means for rotating said dispensing wheel to a dispense position wherein an object to be dispensed from said dispensing wheel is positioned below said dispensing location; and ejecting means, positionable below the object to be dispensed, for ejecting the object to be dispensed from said dispensing wheel against gravity when said wheel is in said dispense position.

2. An apparatus as claimed in claim 1, wherein said dispensing wheel holds coin cassettes containing coin rolls therein, said dispensing wheel including means for receiving coin cassettes; and said ejecting means ejects a predetermined number of coin rolls from a selected cassette.

3. An apparatus as claimed in claim 2, wherein said ejecting means includes:

a pusher arm mechanism disposed adjacent to said dispensing wheel, and linear drive means for reciprocally driving said pusher arm mechanism linearly to eject coin rolls from said selected cassette.

4. An apparatus as claimed in claim 3, wherein said dispensing wheel includes a gear wheel engaged with said rotary drive means, said gear wheel forming a first side of said dispensing wheel, another wheel forming a second side of said dispensing wheel, and connective structure for connecting said gear wheel and said another wheel together in a spaced relationship;

wherein said means for receiving coin cassettes is disposed between said gear wheel and said another wheel to receive cassettes between said wheels; and wherein said pusher arm mechanism includes a pusher arm that extends externally and in parallel to at least one of said dispensing wheel sides and an ejector bar affixed to said pusher arm so as to be disposed between said dispensing wheel sides.

5. An apparatus as claimed in claim 4, wherein said ejector bar has a longitudinal axis that is offset from a center of said dispensing wheel, and wherein said means for receiving cassettes arranges coin cassettes such that one of the cassettes is placed in a dispense position in which said ejector bar longitudinal axis extends longitudinally through the cassette in said dispensing position.

6. An apparatus as claimed in claim 5, wherein said means for receiving coin cassettes includes:

an inner wheel structure located between said dispensing wheel sides, said inner wheel structure having teeth for supporting a cassette therein, and divider members mounted between said dispensing wheel sides, said divider members being arranged in pairs with each pair receiving a cassette therebetween, and wherein said divider members of one pair are in parallel with said longitudinal axis of said ejector bar when said divider members of said one pair are located to dispense a cassette held therebetween at said dispense position.

7. An apparatus as claimed in claim 6, wherein cassettes for the coin rolls have retainer members for retaining each such cassette between said divider members and wherein said divider members each have a shoulder for engagement by a retaining member of each such cassette.

8. A dispensing apparatus comprising:

a rotatable dispensing wheel for holding objects to be dispensed;

rotary drive means for rotating said dispensing wheel to a dispense position, said dispensing wheel including a gear wheel engaged with said rotary drive means, said gear wheel forming a first side of said dispensing wheel, another wheel forming a second side of said dispensing wheel, and inner wheel structure for connecting said gear wheel and said another wheel together in a spaced relationship; and ejecting means for ejecting a predetermined number of objects from said dispensing wheel when said wheel attains said dispense position, said ejecting means including a pusher arm that extends externally and in parallel to at least one of said dispensing wheel sides and an ejector bar affixed to said pusher arm so as to extend into between said dispensing wheel sides, wherein said inner wheel structure includes a first wheel provided in relatively closer proximity to said gear wheel and a second wheel provided in relatively closer proximity to said another wheel of said dispensing wheel, said first and second wheels having a same first diameter, wherein said gear wheel and said another wheel of said dispensing wheel have a second diameter larger than said first diameter, and wherein said ejector bar has a longitudinal length less than said first diameter whereby when said pusher arm is fully retracted, said ejector bar is located between said first and second wheels and no portion of said ejector bar extends beyond a perimeter of said first and second wheels.

9. An apparatus as claimed in claim 4, wherein said rotary drive means and said linear drive means each include a motor and an encoder which generates pulses in response to rotation of a rotor of said motor, and wherein said apparatus further comprises control means for controlling said motors of each of said rotary and linear drive means based upon pulses output from said encoders associated with each said motor in order to rotate said dispensing wheel to position a cassette held by said wheel at a dispense position, and then to drive said pusher arm to eject a selected number of coin rolls from the cassette located at said dispense position.

10. An apparatus as claimed in claim 6, wherein said pusher arm mechanism includes two pusher arms with one pusher arm being located parallel to each of said side wheels of said dispensing wheel, and two ejector bars, one ejector bar being affixed to each of said pusher arms.

11. A dispensing apparatus comprising:

a rotatable dispensing wheel for holding objects to be dispensed;

rotary drive means for rotating said dispensing wheel to a dispense position; and ejecting means for ejecting a predetermined number of objects from said dispensing wheel when said wheel attains said dispense position, said electing means including a pusher arm mechanism disposed adjacent to said dispensing wheel, and linear drive means for reciprocally driving said pusher arm means linearly to eject objects, wherein said dispensing wheel includes a gear wheel engaged with said rotary drive means, said gear wheel forming a first side of said dispensing wheel, another wheel forming a second side of said dispensing wheel, and connective structure for connecting said gear wheel and said another wheel together in a spaced relationship, wherein said pusher arm means includes a pusher arm that extends externally and in parallel to at least one of said dispensing wheel sides and an ejector bar affixed to said pusher arm so as to extend into between said dispensing wheel sides, wherein said rotary drive means and said linear drive means each include a motor and an encoder which generates pulses in response to rotation of a rotor of said motor, wherein said apparatus further comprises control means for controlling said motors of each of said rotary and linear drive means based upon pulses output from said encoders associated with each said motors in order to rotate said dispensing wheel to position an object held by said wheel at a dispense position, and then to drive said pusher arm to eject the object located at said dispense position, and wherein said another side wheel of said dispensing wheel includes a positioning cam.

12. An apparatus as claimed in 11, wherein said control means includes a limit switch for detecting retraction of said pusher arm and a limit switch for detecting said positioning cam of said other side wheel.

13. An apparatus as claimed in claim 12, wherein said apparatus includes:

four said rotatable dispensing wheels, each of said wheels corresponding to one coin denomination from the group of quarters, dimes, nickels, and pennies;

four said rotary drive means, each of said rotary drive means being associated with one of said dispensing wheels; and control means for controlling said four drive means independently.

14. A method of dispensing coin rolls by means of a dispensing apparatus including a rotary dispensing wheel that holds the coin rolls, a frame that supports said dispensing wheel and defines a dispensing location, and an ejecting means for ejecting a predetermined number of coin rolls from said dispensing wheel, said method comprising the steps of:

(A) rotating said dispensing wheel until a coin roll held by said wheel is positioned at a dispensing position below said dispensing location;

(B) halting rotation of said dispensing wheel; and (C) positioning said ejecting means below said coin roll and causing said ejecting means to push a certain number of coin rolls out of said dispensing wheel against gravity.

15. A method as claimed in claim 14, wherein said ejecting means includes pusher arm means disposed to move linearly relative to said dispensing wheel, and wherein said dispensing apparatus further comprises a first motor for driving said dispensing wheel, and a second motor for linearly driving said pusher arm means, said method further comprising the steps of:

(D1) activating said first motor to rotate said dispensing wheel;

(E1) monitoring pulses indicative of rotation of a rotor of said first motor in order to determine an extent of rotation of said dispensing wheel;

(F1) deactivating said first motor to perform said step of halting rotation after a predetermined number of pulses have been counted;

(G1) activating said second motor to drive said pusher arm means;

(H1) monitoring pulses indicative of rotation of a rotor of said second motor in order to determine an extent of linear movement of said pusher arm means; and (I1) deactivating said second motor after a predetermined number of pulses have been counted.

16. An apparatus as claimed in claim 3, further comprising:

control means for controlling said rotary drive means and said linear drive means; and means for sensing a presence or absence of coin rolls in a cassette at said dispense position as said control means causes said linear drive means to drive said pusher arm means into the cassette at said position; and wherein said control means responds to sensing by said sensing means to provide an inventory of coin rolls in the cassette at said position.

17. An apparatus as claimed in claim 16, wherein said control means controls said dispensing apparatus to inventory all cassettes held by said dispensing wheel in order to provide an inventory report of all coin rolls held by said wheel.

18. A dispensing apparatus comprising:

a rotatable dispensing wheel for holding coin cassettes containing coin rolls to be dispensed;

rotary drive means for rotating said dispensing wheel to a dispense position;

a pusher arm mechanism disposed adjacent to said dispensing wheel for ejecting a predetermined number of coin rolls from a selected cassette held by said dispensing wheel when said wheel attains said dispense position;

linear drive means for reciprocally driving said pusher arm means linearly to eject coin rolls from said selected cassette;

control means for controlling said rotary drive means and said linear drive means; and means for sensing a presence or absence of coin rolls in a cassette to be inventoried at said dispense position as said control means causes said linear drive means to drive said pusher arm means into the cassette to be inventoried at said position;

wherein said control means responds to sensing by said sensing means to provide an inventory of coin rolls in the cassette to be inventoried at said position, and wherein said sensing means includes:

a coin door located above the cassette to be inventoried at said dispense position, and a switch for detecting opening of said coin door by a coin roll being pushed toward ejection from the cassette to be inventoried at said position.

19. A method of dispensing coin rolls by means of a dispensing apparatus including a rotary dispensing wheel that holds the coin rolls, an ejecting means for ejecting a predetermined number of coin rolls from said dispensing wheel, and sensing means for sensing a presence or an absence of coin rolls within said dispensing wheel, said method comprising the steps of dispensing a coin roll by:

(A) rotating said dispensing wheel until a coin roll held by said wheel is positioned at a dispensing position;

(B) halting rotation of said dispensing wheel; and (C) causing said ejecting means to push coin rolls out of said dispensing wheel, and comprising the steps of determining a number of coin rolls held by said dispensing apparatus by:

(D2) rotating said dispensing wheel to position a location where coin rolls are holdable by said wheel at said dispensing position, (E2) causing said ejecting means to operate in a manner to push coin rolls out of said dispensing wheel, (F2) sensing by said sensing means when coin rolls are about to be ejected by operation of said ejecting means, and (G2) determining a number of coin rolls held at said coin roll holdable location based upon sensing by said sensing means in step (F2).

20. A method as claimed in claim 19, further comprising the steps of (H2) rotating said dispensing wheel to position a next coin roll holdable location at said dispensing position;

(I2) repeating said steps (E2) through (G2); and (J2) repeating said step (H2) and said step (I2) for all coin holdable locations to thereby inventory all coin rolls held by said dispensing wheel.

* * * * *